Figure 1:
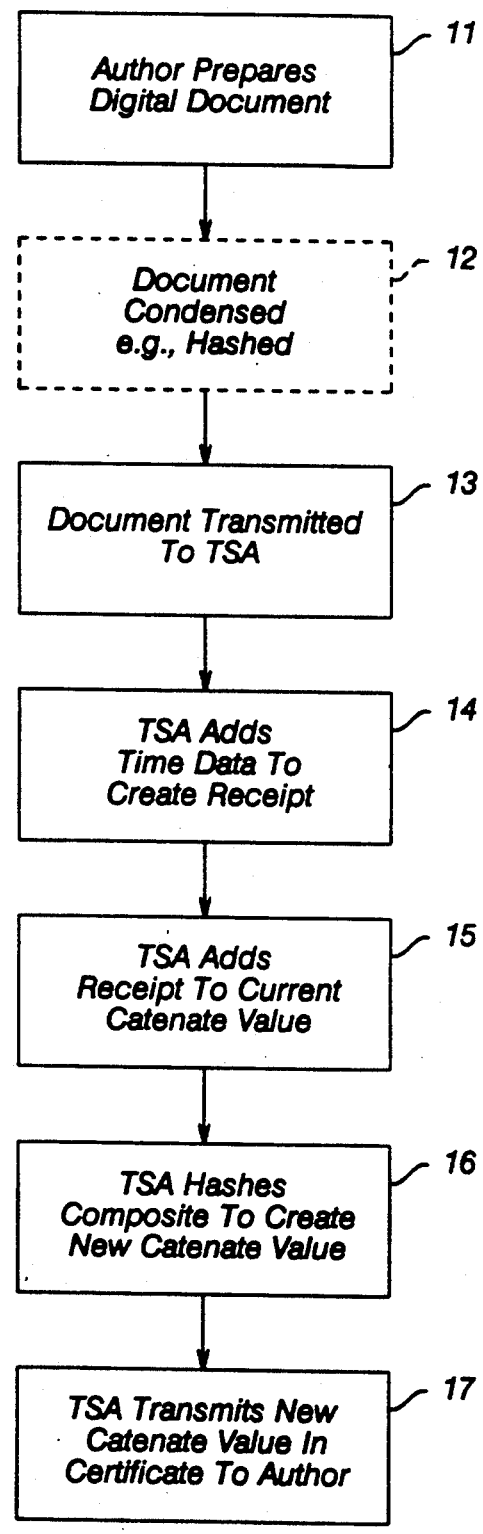

United States Patent [19]
Haber et al.

[11] Patent Number: 5,136,646
[45] Date of Patent: Aug. 4, 1992

[54] DIGITAL DOCUMENT TIME-STAMPING WITH CATENATE CERTIFICATE

[75] Inventors: Stuart A. Haber, New York, N.Y.; Wakefield S. Stornetta, Jr., Morristown, N.J.

[73] Assignee: Bell Communications Research, Inc., Livingston, N.J.

[21] Appl. No.: 666,896

[22] Filed: Mar. 8, 1991

[51] Int. Cl.$^5$ .......................... H04L 9/00; H04L 9/30
[52] U.S. Cl. ........................................ 380/49; 380/23; 380/25; 380/30
[58] Field of Search ........................................ 380/3-5, 380/9, 10, 28, 30, 49, 50

[56] References Cited

U.S. PATENT DOCUMENTS

| | | | |
|---|---|---|---|
| 4,145,568 | 3/1979 | Ehrat | 380/50 X |
| 4,625,076 | 11/1986 | Okamoto et al. | 380/30 X |
| 4,868,877 | 9/1989 | Fischer | 380/30 X |
| 4,881,264 | 11/1989 | Merkle | 380/50 X |
| 4,972,474 | 11/1990 | Sabin | 380/28 |
| 5,001,752 | 3/1991 | Fischer | 380/30 X |

OTHER PUBLICATIONS

"The MD4 Message Digest Algorithm", R. L. Rivest, Crypto '90 Abstracts, Aug. 1990, pp. 281-291.

*Primary Examiner*—Bernarr E. Gregory
*Attorney, Agent, or Firm*—Leonard Charles Suchyta; Lionel N. White

[57]. ABSTRACT

A system for time-stamping a digital document, for example any alphanumeric, video, audio, or pictorial data, protects the secrecy of the document text and provides a tamper-proof time seal establishing an author's claim to the temporal existence of the document. Initially, the document may be condensed to a single number by means of a one-way hash function, thereby fixing a unique representation of the document text. The document representation is transmitted to an outside agency where the current time is added to form a receipt. The agency then certifies the receipt by adding and hashing the receipt data with the current record catenate certificate which itself is a number obtained as a result of the sequential hashing of each prior receipt with the extant catenate certificate. The certified receipt bearing the time data and the catenate certificate number is then returned to the author as evidence of the document's existence. In later proof of such existence, the certificate is authenticated by repeating the certification steps with the representation of the alleged document, the alleged time data, and the catenate certificate number appearing in the agency's records immediately prior to the certificate number in question. Only if the alleged document is identical to the original document will the original and repeat certificate numbers match.

13 Claims, 2 Drawing Sheets

DIGITAL DOCUMENT TIME-STAMPING WITH CATENATE CERTIFICATE

BACKGROUND OF THE INVENTION

In many situations there is a need to establish the date on which a document was created and to prove that the text of a document in question is in fact the same as that of the original dated document. For example, in intellectual property matters it is often crucial to verify the date on which a person first put into writing the substance of an invention. A common procedure for thus "time-stamping" an inventive concept comprises daily notations of one's work in a laboratory notebook. Indelibly dated and signed entries are made one after another on each page of the notebook where the sequentially numbered, sewn-in pages make it difficult to revise the record without leaving telltale signs. The validity of the record is further enhanced by the regular review and signed witnessing by a generally disinterested third party. Should the time of the concept become a matter for later proof, both the physical substance of the notebook and the established recording procedure serve as effective evidence in substantiating the fact that the concept existed at least as early as the notebook witness date.

The increasingly widespread use of electronic documents, which include not only digital representations of readable text but also of video, audio, and pictorial data, now poses a serious threat to the viability of the "notebook" concept of establishing the date of any such document. Because electronic digital documents are so easily revised, and since such revisions may be made without telltale sign, there is available limited credible evidence that a given document truly states the date on which it was created or the message it originally carried. For the same reasons there even arises serious doubt as to the authenticity of a verifying signature. Without an effective procedure for ensuring against the surreptitious revision of digital documents, a basic lack of system credibility prevents the efficiencies of electronic documentation from being more widely implemented.

Some procedures are presently available for verifying electronic document transmissions; however, such procedures are limited in application to bilateral communications. That is, in such communications the sender essentially desires to verify to the receiver the source and original content of the transmitted document. For example, "private key" cryptographic schemes have long been employed for message transmission between or among a limited universe of individuals who are known to one another and who alone know the decrypting key. Encryption of the message ensures against tampering, and the fact that application of the private key reveals the "plaintext" of the transmitted message serves as proof that the message was transmitted by one of the defined universe. The time of creation of the message is only collaterally established, however, as being not later than its receipt by the addressee. This practice thus fails to provide time-stamp evidence that would be useful in an unlimited universe at a later date.

A more broadly applicable verifying communication procedure, that of "public key" cryptography, has been described by Diffie and Hellman ("New Directions in Cryptography", *IEEE Transactions On Information Theory*, Vol IT-22, November 1976, pp. 644-654). While this scheme expands the utilizing universe to a substantially unlimited number of system subscribers who are unknown to one another, but for a public directory, verifiable communications remain bilateral. These limitations persist, since although a public key "signature", such as that which entails public key decryption of a message encrypted with the private key of the transmitter, provides any member of the unlimited universe with significant evidence of the identity of the transmitter of the message, only a given message recipient can be satisfied that the message existed at least as early as the time of its receipt Such receipt does not, however, provide the whole universe with direct evidence of time of the message's existence Testimony of a such a recipient in conjunction with the received message could advance the proof of message content and time of its existence, but such evidence falls victim to the basic problem of ready manipulation of electronic digital document content, whether by originator or witness Thus, the prospect of a world in which all documents are in easily modifiable digital form threatens the very substance of existing procedures for establishing the credibility of such documents As a means of providing an answer to this burgeoning problem, we disclosed in our copending U.S. Pat. application Ser. No. 07/561,888, file Aug. 2, 1990, a system of verification by which a digital document may be so fixed in time and content that it can present, at least to the extent currently recognized in tangible documents, direct evidence on those issues.

The method described there entails transmittal of a document to an outside agency where current time data are incorporated with at least a portion of a digital representation of the document. In order to prevent collusive misstamping by the agency, one or more agencies are selected at random or an agency is required to incorporate into the time stamp receipt at least the time and a portion of identifying data from one or more temporally adjacent receipts Although this procedure accomplishes the two-fold goals of effective time-stamping, i.e., to fix the time and content of a document and to prevent collusive misdeeds of author and agent-witness, any subsequent personal interaction between participating authors may be burdensome, particularly in later proof stages where the comparison of contemporary receipts is required.

SUMMARY OF THE INVENTION

The present invention represents an improvement on our above-mentioned system and provides a reliable and more adaptable method of time-stamping digital documents that continues to maintain the two essential characteristics of accepted document verification. First, the content of a document and a time stamp of its existence are "indelibly" incorporated into the digital data of the document so that it is not possible to change any bit of the resulting time-stamped data without such a change being apparent. In this manner, the state of the document content is fixed at the instant of time-stamping. Second, the time at which the digital document is stamped is certified by a cryptographic summary, or catenation, procedure that deters the incorporation of a false time statement. In essence, the method transfers control of the time-stamping step from the author to an independent agent and removes from the author the ability to influence the agent in the application of other than a truthful time stamp.

One embodiment of the present invention presumes a number of document authors distributed throughout a communication network. Such authors may be individuals, companies, company departments, etc., each representing a distinct and identifiable, e.g., by ID number or the like, member of the author universe. This universe would be supported by a central record repository and would, in essence, constitute the clientele of such an outside time-stamping agency (TSA).

In this particular application, as depicted in FIG. 1 of the drawing, the method entails an author's preparation of a digital document, which may broadly comprise any alphanumeric, audio, or pictorial presentation, and the transmission of the document, preferably in a condensed representative form, to the TSA. The TSA time-stamps the document to create a receipt by adding digital data signifying the current time, concatenates the receipt with the current cryptographic catenation of its prior time stamp receipts, and creates a new catenation from the composite document by means of a deterministic function, such as discussed in greater detail below. The resulting catenate value is then included with time and other identifying data in a document, now a certificate of the temporal existence of the original document, which is transmitted back to the author where it will be held for later use in any required proof of such existence.

To ensure against interception of confidential document information during transmission to the TSA, and to reduce the digital bandwidth required for transmission of an entire document, the author may optionally convert the digital document string to a unique value having vastly condensed digital size by means of a deterministic function which may, for example, be any one of a number of algorithms known in the art as "one-way hash functions". Such an application of hash functions has been described, among others, by Damgard in his discussions on the improvement of security in document signing techniques ("Collision-Free Hash Functions and Public Key Signature Schemes", *Advances in Cryptology—Eurocrypt '87*, Springer-Verlag, LNCS, 1988, Vol. 304, pp. 203-217). In practice of the present invention, however, the "one-way" characteristic typical of a hashing algorithm serves an additional purpose; that is, to provide assurance that the document cannot be secretly revised subsequent to the time the TSA applies its time stamp and incorporates the document into the catenate certificate.

A hashing function provides just such assurance, since at the time a document, such as an author's original work or a composite receipt catenation, is hashed there is created a representative "fingerprint" of its original content from which it is virtually impossible to recover that document. Therefore, the time-stamped document is not susceptible to revision by any adversary of the author. Nor is the author able to apply an issued time-stamp certificate to a revised form of the document, since any change in the original document content, even to the extent of a single word or a single bit of digital data, results in a different document that would hash to a completely different fingerprint value. Although a document cannot be recovered from its representative hash value, a purported original document can nonetheless be proven in the present time-stamping procedure by the fact that a receipt concatenation comprising a true copy of the original document representation will always hash to the same catenate value as is contained in the author's certificate, assuming use of the original hashing algorithm.

Any available deterministic function, e.g. a one-way hash function such as that described by Rivest ("The MD4 Message Digest Algorithm", *Advances in Cryptology—Crypto '90*, Springer-Verlag, LNCS, to appear), incorporated herein by reference, may be used in the present procedure. In the practice of the invention, such a hashing operation is optionally employed by the author to obtain the noted benefit of transmission security, although it might be effected by the TSA if the document were received in plaintext form. In whatever such manner the document content and incorporated time data are fixed against revision, there remains the further step, in order to promote the credibility of the system, of certifying to the members of an as yet unidentified universe that the receipt was in fact prepared by the TSA, rather than by the author, and that the time indication is correct, i.e., that it has not, for instance, been fraudulently stated by the TSA in collusion with the author.

To satisfy these concerns, the TSA maintains a record of its sequential time-stamping transactions by adding each new receipt to its current catenation and applying its deterministic function, e.g. hashing, the composite to obtain a new catenation. This catenation, itself a value resulting from the hashing process, is included on the receipt or certificate returned to the author and serves to certify the indicated time stamp. Confirmation of the certificate at a later time involves rehashing the combination of the author's time receipt and the next previous catenate value in the TSA records. The resulting generation of the author's catenate certificate value proves to the author and to the universe at large that the certificate originated with the TSA. This result also proves the veracity of the time-stamp itself, since all original elements of the original receipt must be repeated in order to again generate, by the hashing function, the original catenate certificate value.

The process of the invention relies upon the relatively continuous flow of documents from the universe of authors through the facilities of the TSA. For each given processed document $D_k$, from an author, $A_k$, the TSA generates a time-stamp receipt which includes, for example, a sequential receipt transaction number, $r_k$, the identity of the author, for example by ID number $ID_k$, or the like, a digital representation, e.g. the hash, $H_k$, of the document, and the current time, $t_k$. The TSA then includes these receipt data, or any representative part thereof, with the catenate certificate value, $C_{k-1}$, of the immediately preceding processed document $D_{k-1}$, of author, $A_{k-1}$, thereby bounding the time-stamp of document $D_k$ by the independently established earlier receipt time, $t_{k-1}$.

The composite data string, $r_k$, $ID_k$, $H_k$, $t_k$, $C_{k-1}$, is then hashed to a new catenate value, $C_k$, that is entered with transaction number, $r_k$, in the records of the TSA, and is also transmitted to $A_k$, as the catenate certificate value, with the time-stamp receipt data. In like manner, a certificate value derived from the hashing of $C_k$ with time stamp elements of the receipt for document $D_{k+1}$, would be transmitted to author, $A_{k+1}$. Thus, each of the time-stamped catenate certificates issued by the TSA is fixed in the continuum of time and none can be falsely prepared by the TSA, since any attempt to regenerate a catenate certificate number from a hash with the next prior certificate would reveal the discrepancy.

Figure 2:
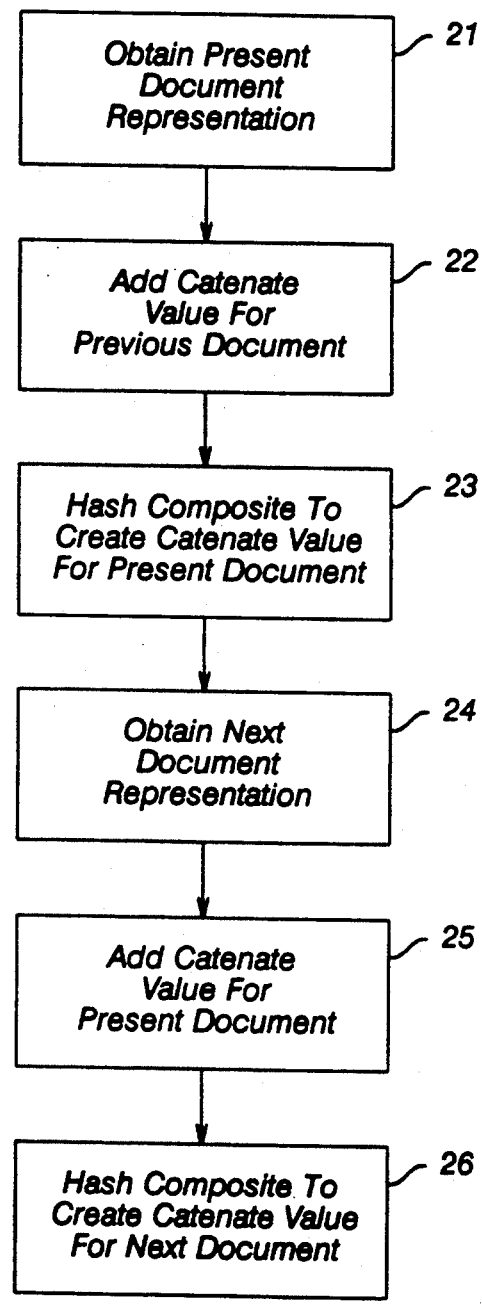

In a more general application of the invention, as shown in FIG. 2, the representation, e.g., a hash, of a particular document is simply concatenated with the catenate certificate value of the next previous document and the deterministic function representation, again a hash, for example, of this composite is then generated and retained as the record catenate value for the particular document Each subsequent document in the growing series is similarly processed to expand the record which itself would serve as a reliable certification of the position each such document occupies in the series, or more broadly viewed, in the continuum of time. This embodiment of the invention provides a reliable method by which an organization, for instance, could readily certify the sequence and continuity of its digital business documents and records.

Additional variations in the process of the invention might include the accumulation of documents, preferably in hashed or other representative form, generated within an author organization over a period of time, e.g. a day or more depending upon the extent of activity, with the collection being hashed to present a single convenient document for time-stamping and certification. As an alternative, an organizational designee might serve as a resident "outside" agency who would maintain a catenate certificate record of organization documents by means of the present procedure and on a regular basis would transmit the then current catenate certificate to a TSA. In this manner the sequence of an organization's business records would be established both within the organization and externally through the TSA.

Also, the implementation of process embodiments might readily be automated in simple computer programs which would directly carry out the various steps of hashing, transmitting, and concatenating original document representations, applying current time stamps, generating and recording catenate certificate values, and providing receipt certificates.

THE DRAWING

The present invention will be described with reference to the accompanying drawing of which:

FIG. 1 is a flow diagram of an embodiment of the time-stamping process according to the invention; and FIG. 2 is a flow diagram of the general catenation process according to the invention.

DESCRIPTION OF THE INVENTION

The following exemplary application of the present invention, as depicted in the steps of the drawing, will serve to further describe the time-stamping process. For convenience in the presentation of this example, the deterministic function employed is the md4 hashing algorithm described by Rivest, as mentioned above; however, the function actually selected by a TSA could be any of various available algorithms. Whatever algorithm is implemented, records of its identity and period of use must be maintained for later proof of certified receipts.

The present time-stamping procedure begins, as at step 11 of the drawing, with the preparation of a digital document by the author, e.g. $A_k$. As previously noted, this digital document may be the digital form or representation of any alphanumeric text or video, audio, pictorial or other form of fixed data. Although the present process may be used with documents of any length, the following excerpt is amply representative of a document, $D_k$, for which time-stamping is desired:

... the idea in which affirmation of the world and ethics are contained side by side ... the ethical acceptance of the world and of life, together with the ideals of civilization contained in this concept ... truth has no special time of its own. Its hour is now—always.
Schweitzer If the author so desires, the document, $D_k$, may, for the purposes of security as well as to reduce the required transmission bandwidth, be condensed by means, for example, of the md4 algorithm. As indicated by the optional, dashed step 12, the document is thus hashed to a value, $H_k$, of a standard 128 bit format which, expressed in base 16, appears as:

ee2ef3ea60df10cb621c4fb3f8dc34c7

It should be noted at this point that the hexadecimal and other numerical value representations used in this example are not in such form crucial to the implementation of the invention. That is to say, any portion or other distinct representation of those values selected according to a given procedure would function as well.

Author, $A_k$, whose assigned identification number, $ID_k$, is 634 in a 1000 member author universe, then transmits the document, at step 13, to the system TSA in the identifying message, ($ID_k$, $H_k$), which appears:

634, ee2ef3ea60df10cb621c4fb3f8dc34c7 as a request that the document be time-stamped.

The TSA, at step 14, prepares the receipt for document, $D_k$, by adding a sequential receipt transaction number, $r_k$, of 1328, for example, and a statement of the current time, $t_k$. This time statement might be a standard binary representation of computer clock time or simply a literal statement, e.g., 19:46:28 Greenwich Mean Time on Mar. 6, 1991, in order to allow the final time-stamp certificate to be easily read. The receipt then comprises the string, ($r_k$, $t_k$, $ID_k$, $H_k$), which appears as follows;

1328, 194628GMT06MAR91, 634,
ee2ef3ea60ef10cb621c4fb3f8dc34c7

In accordance with the invention, the records of the TSA at this time contain a catenation of all its prior receipt transactions in the form, for example, of the values resulting from the hashing of each consecutive receipt with the record catenation to that time. This catenate record would thus have been developed as follows. The receipt of first transaction ($r_{k=1}$) was hashed with an initial datum value, e.g., the hash of the identification of the TSA, to yield the first catenate value, $C_1$, which was then used as the certificate value for that first transaction. In the next transaction, the receipt was concatenated with $C_1$ and the composite hashed to yield the second catenate certificate value, $C_2$, and so on through the entire history of the TSA time-stamping operation.

Assume now that the document, $D_{k-1}$, immediately preceding that of the present example had been processed by the TSA, in its 1327th receipt transaction, to yield as the catenate certificate value, $C_{k-1}$:

26f54eae925156b1f0d6047c2de6e0fcf

In step 15 of the process, the TSA now concatenates with this value the receipt for $D_k$ to obtain:

```
26f54eae92516b1f0d6047c2de6e0fcf, 1328,
194628GMT06MAR91, 634,
ee2ef3ea60df10cb621c4fb3f8dc34c7
```

This composite is then hashed by the TSA, at step 16, to yield as the new catenate certificate value, $C_k$:

```
46f7d75f0fbea95e96fc38472aa28ca1
```

The TSA then adds this value to its records and prepares and transmits to author, $A_k$, at step 17, a time-stamp certificate, including this catenate certificate value, which might appear as:

| | |
|---|---|
| Transaction Number: | 1328 |
| Client ID Number: | 634 |
| Time: | 19:46:28 Greenwich Mean Time |
| Date: | 06 March 1991 |
| Certificate Number: | 46f7d75f0fbea95e96fc38472aa28ca1 |

The procedure would be repeated by the TSA for each subsequent time stamp request. Assuming the next request from $A_{k+1}$ was received with the document in the form of its hash $H_{k+1}$, as:

```
201, 882653ee04d511dbb5e06883aa27300b
``` at 19:57:52 GMT on Mar. 6, 1991, the composite concatenation would appear:

```
46f7d75f0fbea95e96fc38472aa28ca1, 1329,
195752GMT06MAR1991, 201,
882653ee04d511dbb5e06883aa27300b
``` and the certificate returned to $A_{k+1}$ would read:

| | |
|---|---|
| Transaction Number: | 1329 |
| Client ID Number: | 201 |
| Time: | 19:57:52 Greenwich Mean Time |
| Date: | 06 March 1991 |
| Certificate Number: | d9bb1b11d58bb09c2763e7915fbb83ad |

When, at a later date, author, $A_{k+1}$, desires to prove the authenticity of document, $D_{k+1}$, as that which was received and dated by the TSA on Mar. 6, 1991 at 19:57:52, the records of the TSA are examined to obtain the catenate certificate value, $C_k$, of the next previous transaction, 1328, which appears as:

```
46f7d75f0fbea95e96fc38472aa28ca1
```

The alleged document is then reduced to the form in which it was transmitted to the TSA, e.g, as its hash, and this value is then concatenated with $C_k$ and the remaining data from the certificate of $A_{k+1}$. The resulting composite, assuming the alleged document to be authentic, now appears as:

```
46f7d75f0fbea95e96fc38472aa28ca1, 1329,
195752GMT06MAR1991, 201,
882653ee04d511dbb5e06883aa27300b
``` which, when hashed, produces the correct catenate certificate value:

```
d9bb1b11d58bb09c2763e7915fbb83ad
``` thereby proving the alleged document to be $D_{k+1}$. Otherwise, a revised document would hash to a different value and the composite of which it is an element would hash to a catenate certificate value different from that stated in the certificate of transaction number 1329.

If further proof were demanded, for example upon an adversary allegation that $C_{k+1}$ had been falsified after the fact of a document revision, the certificate and the submitted, e.g. hashed, document of $A_k$, who is identified from TSA records, would be employed in an attempt to regenerate the subsequent, questioned certificate value, $C_{k+1}$. If that value were correct, $D_{k+1}$ would be proved. As an alternative, the certificate value, $C_{k+1}$, could be proved by the regeneration of the subsequent catenate certificate value, $C_{k+2}$, from the certificate data and submitted document of $A_{k+2}$, since no feasible revision could be made to that later document which would result in a match of $C_{k+2}$ if $C_{k+1}$ were not the same as existed at the time of the transaction, 1330, processing $D_{k+2}$.

In the more general record catenation procedure depicted in FIG. 2, the documents in a growing series are processed, within an organization or by a TSA, as each is generated. At step 21, a new document representation, such as would be generated by a hashing deterministic function algorithm, becomes available and, at step 22, is concatenated with the current record catenate value that was generated in the processing of the previous document. This composite is then processed, e.g., hashed, at step 23, to generate the new catenate value for the present document. This value may be separately recorded and utilized for inclusion in a certificate, or simply retained in the processing system for application to the next document which is presented at step 24. The subsequent processing steps 25, 26 are applied to this document representation, and the process repeats with each new document in its turn.

The procedures described and variants suggested herein for the practice of this time-stamping process and the various other embodiments which will become apparent to the skilled artisan in the light of the foregoing description are all nonetheless to be included within the scope of the present invention as defined by the appended claims.

What is claimed is:

1. A method of certifying the temporal sequence of digital documents in a series of such documents characterized in that said method comprises:
   a) generating a digital representation of a specified one of the documents in said series; and
   b) generating a catenate certificate value representation for said specified document by applying a selected deterministic function algorithm to a catenation comprising said digital representation and the catenate certificate value representation for the document immediately prior in said series to said specified document.

2. A method according to claim 1 characterized in that the method further comprises repeating the recited steps with each subsequent document in said series.

3. A method according to claim 2 characterized in that said method further comprises maintaining a sequential record of said series documents with their respective catenate certificate value representations.

4. A method according to claim 2 characterized in that each said digital representation is generated by applying to said document one or another deterministic function algorithm which may be the same as or different from said selected deterministic function algorithm.

5. A method according to claim 4 characterized in that said one or another deterministic function algorithm is any one-way hashing algorithm.

6. A method according to claim 2 characterized in that said selected deterministic function algorithm is any one-way hashing algorithm.

7. A method of time-stamping a digital document which comprises transmitting a digital representation of said document to an outside agency, creating at said outside agency a receipt comprising a digital representation of then current time and at least a portion of a digital representation of said digital document, and certifying said receipt at said outside agency characterized in that the certifying of said receipt comprises:
 a) concatenating a digital representation of said receipt with a representation of a prior catenate certificate value to form a composite; and
 b) generating a catenate certificate value for said receipt by applying a selected deterministic function algorithm to said composite.

8. A method of time-stamping a digital document according to claim 7 characterized in that said outside agency maintains a record comprising the catenate certificate values of prior time-stamping transactions.

9. A method of time-stamping a digital document according to claim 7 characterized in that said prior certificate value representation comprises at least a portion of the catenate certificate value of the immediately preceding recording time-stamping transaction.

10. A method of time-stamping a digital document according to claim 7 characterized in that said selected deterministic function algorithm is any one-way hashing algorithm.

11. A method of time-stamping a digital document according to claim 7 characterized in that said transmitted digital document representation comprises at least a portion of the digital representation of the value derived by applying to said digital document one or another deterministic function algorithm which may be the same as or different from said selected deterministic function algorithm.

12. A method of time-stamping a digital document according to claim 7 characterized in that said receipted digital document representation comprises at least a portion of the digital representation of the value derived by applying to said digital document one or another deterministic function algorithm which may be the same as or different from said selected deterministic function algorithm.

13. A method of time-stamping a digital document according to claim 12 characterized in that said one or another deterministic function is any one-way hashing algorithm.

* * * * *